US012683781B2

(12) United States Patent
Hojjati

(10) Patent No.: US 12,683,781 B2
(45) Date of Patent: Jul. 14, 2026

(54) QUANTUM VAULT FOR PROTECTING SECRETS AGAINST QUANTUM COMPUTING

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 141 days.

(21) Appl. No.: 18/607,838

(22) Filed: Mar. 18, 2024

(65) Prior Publication Data

US 2025/0293877 A1    Sep. 18, 2025

(51) Int. Cl.
*H04L 9/16* (2006.01)
*G06N 10/20* (2022.01)
*H04L 9/08* (2006.01)

(52) U.S. Cl.
CPC .............. *H04L 9/16* (2013.01); *G06N 10/20* (2022.01); *H04L 9/0825* (2013.01)

(58) Field of Classification Search
CPC .......... H04L 9/16; H04L 9/0825; G06N 10/20
See application file for complete search history.

(56) References Cited

U.S. PATENT DOCUMENTS

| 11,838,410 | B1 * | 12/2023 | Ramanathan | ......... H04L 9/0825 |
| 2019/0158271 | A1 * | 5/2019 | Lowry | ..................... H04L 9/065 |
| 2023/0300129 | A1 | 9/2023 | Hojjati et al. | |
| 2023/0344639 | A1 | 10/2023 | Hojati et al. | |
| 2023/0344650 | A1 | 10/2023 | Hojjati et al. | |
| 2023/0385811 | A1 | 11/2023 | Naidoo et al. | |

* cited by examiner

*Primary Examiner* — Quazi Farooqui
(74) *Attorney, Agent, or Firm* — Baratta Law PLLC; Lawrence A. Baratta, Jr.

(57) ABSTRACT

Systems and methods for managing a quantum vault for storing a secret include, responsive to a determination of a first level of quantum computing processing capability, defining a first encryption algorithm for the quantum vault such that the first encryption algorithm is sufficient to protect against the first level of quantum computing, such that a first layer of the quantum vault is configured with the first encryption algorithm; and monitoring the quantum computing processing capability; and responsive to a determination of a second level of the quantum computing processing capability where the first encryption algorithm is no longer sufficient to protect against, defining a second encryption algorithm for the quantum vault such that the second encryption algorithm is sufficient to protect against the second level of quantum computing processing capability, and such that the second encryption algorithm is configured as an outermost layer over the first encryption algorithm.

19 Claims, 4 Drawing Sheets

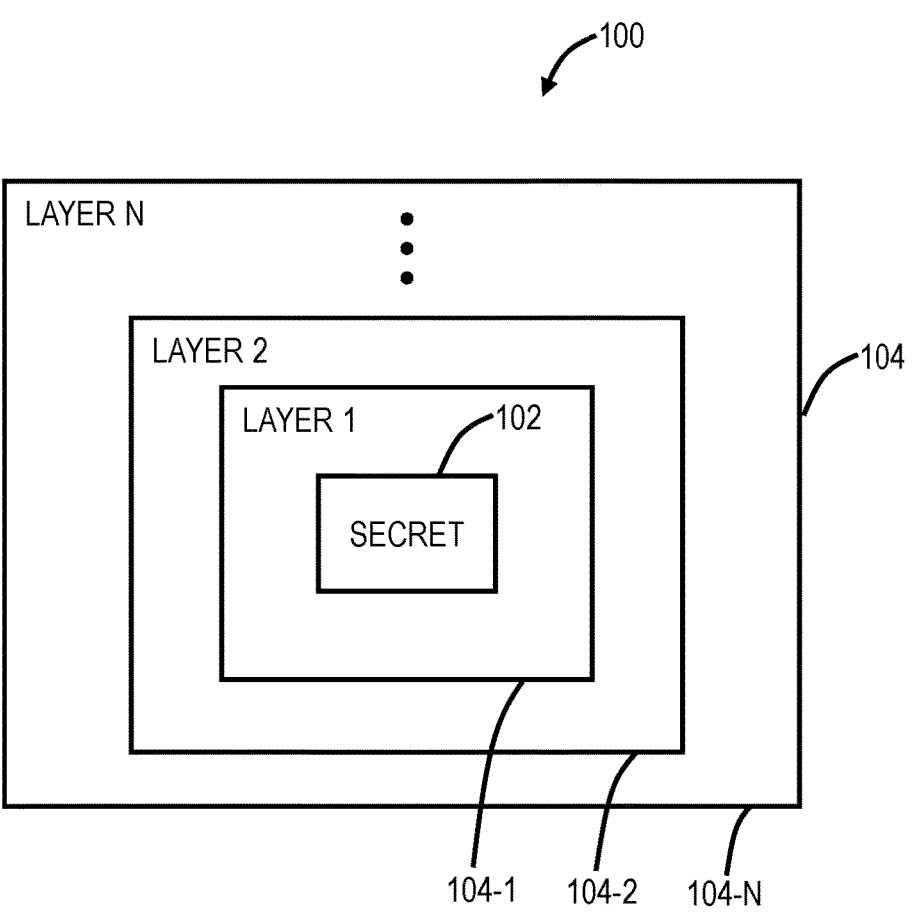
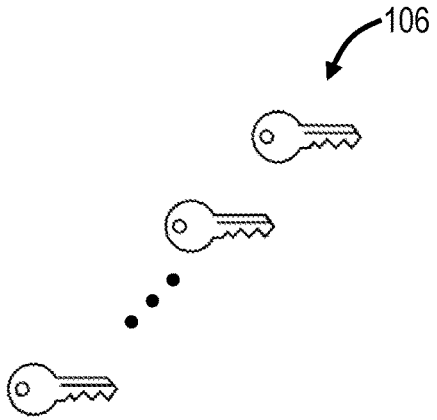
*FIG. 1*

RESPONSIVE TO A DETERMINATION OF A FIRST LEVEL OF QUANTUM COMPUTING PROCESSING CAPABILITY, DEFINING A FIRST ENCRYPTION ALGORITHM FOR THE QUANTUM VAULT SUCH THAT THE FIRST ENCRYPTION ALGORITHM IS SUFFICIENT TO PROTECT AGAINST THE FIRST LEVEL OF QUANTUM COMPUTING, SUCH THAT A FIRST LAYER OF THE QUANTUM VAULT IS CONFIGURED WITH THE FIRST ENCRYPTION ALGORITHM          202

MONITORING THE QUANTUM COMPUTING PROCESSING CAPABILITY          204

RESPONSIVE TO A DETERMINATION OF A SECOND LEVEL OF THE QUANTUM COMPUTING PROCESSING CAPABILITY WHERE THE FIRST ENCRYPTION ALGORITHM IS NO LONGER SUFFICIENT TO PROTECT AGAINST, DEFINING A SECOND ENCRYPTION ALGORITHM FOR THE QUANTUM VAULT SUCH THAT THE SECOND ENCRYPTION ALGORITHM IS SUFFICIENT TO PROTECT AGAINST THE SECOND LEVEL OF QUANTUM COMPUTING PROCESSING CAPABILITY, AND SUCH THAT THE SECOND ENCRYPTION ALGORITHM IS CONFIGURED AS AN OUTERMOST LAYER OVER THE FIRST ENCRYPTION ALGORITHM          206

*FIG. 2*

250

| |
|---|
| OBTAINING A SECRET FOR STORAGE ON THE COMPUTING DEVICE |

252

| |
|---|
| CREATING A QUANTUM VAULT WHERE THE SECRET IS STORED THEREIN, THE QUANTUM VAULT COMPRISING A FIRST ENCRYPTION ALGORITHM PROTECTING THE SECRET, THE FIRST ENCRYPTION ALGORITHM IS SUFFICIENT TO PROTECT AGAINST A FIRST LEVEL OF QUANTUM COMPUTING, AND THE FIRST ENCRYPTION ALGORITHM BEING A FIRST LAYER OF THE QUANTUM VAULT |

254

| |
|---|
| RECEIVING AN UPDATE FOR THE QUANTUM VAULT RESPONSIVE TO A DETERMINATION OF A SECOND LEVEL OF THE QUANTUM COMPUTING PROCESSING CAPABILITY WHERE THE FIRST ENCRYPTION ALGORITHM IS NO LONGER SUFFICIENT TO PROTECT AGAINST THE FIRST LEVEL OF QUANTUM COMPUTING |

256

| |
|---|
| CREATING A SECOND LAYER OF THE QUANTUM VAULT WITH A SECOND ENCRYPTION ALGORITHM FOR THE QUANTUM VAULT SUCH THAT THE SECOND ENCRYPTION ALGORITHM IS SUFFICIENT TO PROTECT AGAINST THE SECOND LEVEL OF QUANTUM COMPUTING PROCESSING CAPABILITY, AND SUCH THAT THE SECOND ENCRYPTION ALGORITHM IS CONFIGURED AS AN OUTERMOST LAYER OVER THE FIRST ENCRYPTION ALGORITHM |

QUANTUM VAULT FOR PROTECTING SECRETS AGAINST QUANTUM COMPUTING

FIELD OF THE DISCLOSURE

The present disclosure relates generally to computing, namely encryption. More particularly, the present disclosure relates to systems and methods for a quantum vault for protecting secrets against quantum computing.

BACKGROUND OF THE DISCLOSURE

Encryption is a process of encoding information for security purposes. Specifically, encryption involves converting an original representation of the information into an alternative form that is only accessible, via decryption by an authorized recipient or user. As described herein, the information can be any type of data in computing and networking, as well as data at rest or data in motion. For example, data at rest refers to data at the storage level, where the encryption protects this data from being viewed by only authorized users. Data in motion refers to data being transmitted, and the encryption here protects the communication channel, preventing an unauthorized recipient, eavesdropper, etc. With respect to encryption, every algorithm in use today will be broken once there are stable and powerful enough quantum computers. That is, there conventional algorithms can include asymmetric algorithms with different keys (e.g., RSA) as well as symmetric algorithms with the same key (e.g., AES). The problem is a lot of data being protected with these conventional algorithms and it is not easy to change the existing algorithms. This is because there is a lot of data and applications that would need to change, Post Quantum Cryptography (PQC) algorithms require more performance, and various PQC algorithms are not yet standardized. However, there is still a need to protect data today against future Quantum Computers (QC).

BRIEF SUMMARY OF THE DISCLOSURE

The present disclosure relates to systems and methods for a quantum vault for protecting secrets against quantum computing. In particular, the present disclosure provides an approach to secure secrets today in a manner that continues to protect those secrets with the ever-evolving increase in QC. This is done through a so-called quantum vault which is an approach to secure secrets (e.g., in a Hardware Security Module (HSM), a software-based HSM, a regular vault on a computing device, or simply in any storage medium). The quantum vault is a software-based implementation, requiring no new hardware, which secures a given secret via one or more encryption algorithms in a layered approach. The given secret is located in the center and the one or more encryption algorithms form layers around the secret, such that the outermost layer is one which is capable of protecting the secret against the current state of quantum computing. In this manner, the secrets are maintained secure, the PQC approach can evolve as needed to address the current state, and, importantly, there is no need to update decades worth of infrastructure invested in conventional encryption algorithms.

In an embodiment, a method for managing a quantum vault for storing a secret includes steps of, responsive to a determination of a first level of quantum computing processing capability, defining a first encryption algorithm for the quantum vault such that the first encryption algorithm is sufficient to protect against the first level of quantum computing, such that a first layer of the quantum vault is configured with the first encryption algorithm; and monitoring the quantum computing processing capability; and responsive to a determination of a second level of the quantum computing processing capability where the first encryption algorithm is no longer sufficient to protect against, defining a second encryption algorithm for the quantum vault such that the second encryption algorithm is sufficient to protect against the second level of quantum computing processing capability, and such that the second encryption algorithm is configured as an outermost layer over the first encryption algorithm. The steps also can be implemented by a cloud service, a processing device, and embodied as instructions for programming one or more processors to implement the steps with the instructions being stored in a non-transitory computer-readable medium.

In another embodiment, a computing device includes one or more processors and memory storing instructions that, when executed, cause the one or more processors to perform steps of obtaining a secret for storage on the computing device; creating a quantum vault where the secret is stored therein, the quantum vault comprising a first encryption algorithm protecting the secret, the first encryption algorithm is sufficient to protect against a first level of quantum computing, and the first encryption algorithm being a first layer of the quantum vault; receiving an update for the quantum vault responsive to a determination of a second level of the quantum computing processing capability where the first encryption algorithm is no longer sufficient to protect against the first level of quantum computing; and creating a second layer of the quantum vault with a second encryption algorithm for the quantum vault such that the second encryption algorithm is sufficient to protect against the second level of quantum computing processing capability, and such that the second encryption algorithm is configured as an outermost layer over the first encryption algorithm. The steps also can be implemented as a method and embodied as instructions for programming one or more processors to implement the steps with the instructions being stored in a non-transitory computer-readable medium.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a logical diagram of a quantum vault.

FIG. 2 is a flowchart of a process for managing a quantum vault by a service provider.

FIG. 3 is a flowchart of a process for securing a secret with a quantum vault at a computing system, such as user equipment.

FIG. 4 is a block diagram of a computing system, which may be used to implement a quantum vault and the like.

DETAILED DESCRIPTION OF THE DISCLOSURE

Figure 4:
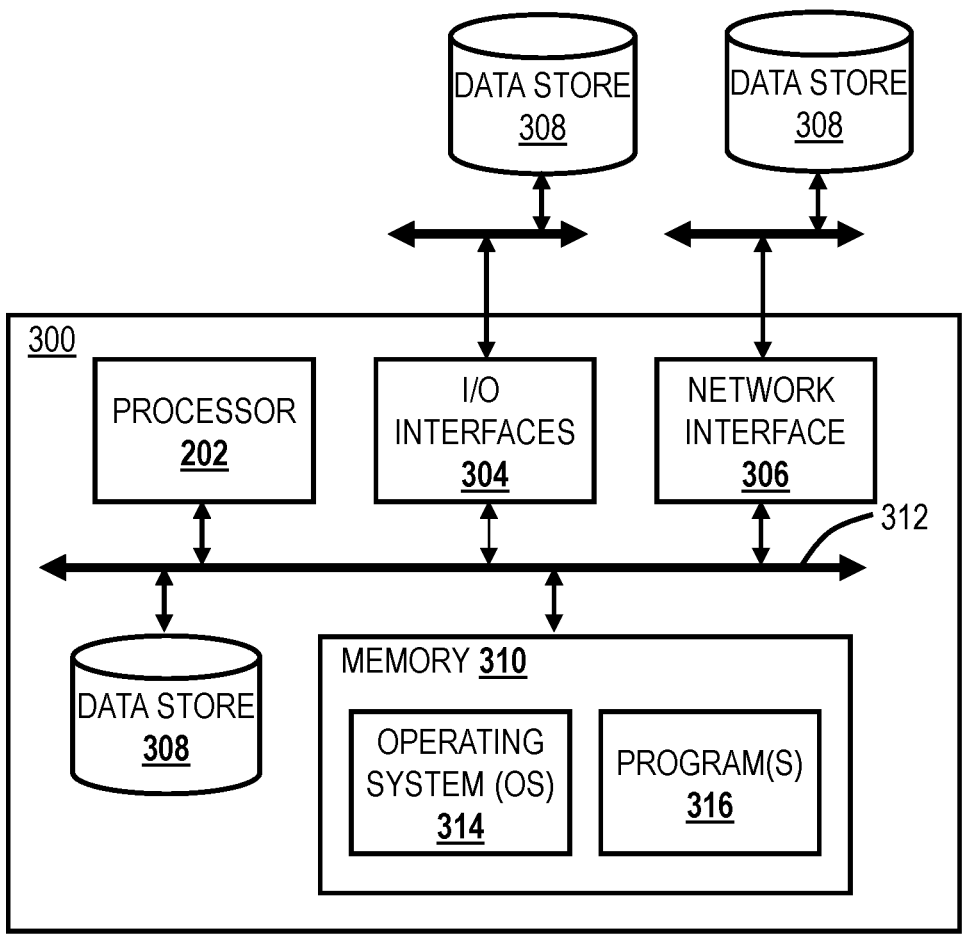

Again, the present disclosure relates to systems and methods for a quantum vault for protecting secrets against quantum computing. The present disclosure utilizes the term "quantum vault" to refer to a process, technique, method, etc. of protecting secrets on a computing device, platform, or service. This is done in a layered manner so that the outermost layer utilizes a PQC algorithm that is able to protect against the current state of quantum computers, i.e., the outermost PQC algorithm protects against the qubit processing capacity of state-of-the-art quantum computers. As the qubit processing capacity increases, it is possible to add another layer to the quantum vault, via software, instead of having to change the entire infrastructure. That is, decades worth of encryption can remain using AES, RSA, etc., while the associated secrets (which are keys in this use case) are protected against quantum computers.

Encryption Today

Encryption algorithms are fundamental tools in securing data, and there generally are two main types: symmetric and asymmetric. Symmetric encryption uses the same key for both encryption of plaintext and decryption of ciphertext. The key must be shared among the parties wishing to communicate securely. Here are the key characteristics and examples of symmetric encryption:

Key Sharing: Since the same key is used for both encryption and decryption, it must be securely shared and kept secret among the authorized parties. This can be challenging, especially over insecure channels.

Speed: Symmetric encryption algorithms are generally faster and less computationally intensive than asymmetric ones, making them suitable for encrypting large volumes of data.

Examples: AES (Advanced Encryption Standard), DES (Data Encryption Standard), and 3DES (Triple Data Encryption Standard) are common symmetric encryption algorithms. AES, in particular, is widely used due to its high security and efficiency.

Asymmetric encryption, also known as public-key encryption, uses two different keys: a public key for encryption and a private key for decryption. The public key can be shared with anyone, but the private key is kept secret by the owner.

Key Pairs: The two keys in an asymmetric encryption system are mathematically related but not identical. The public key encrypts data, and only the corresponding private key can decrypt it. This allows anyone to send encrypted messages to the key owner without needing to share a secret key in advance.

Use Cases: Asymmetric encryption is often used for secure key exchange, digital signatures, and establishing secure communications (e.g., SSL (Secure Socket Layer)/ TLS (Transport Layer Security) for websites).

Examples: RSA (Rivest-Shamir-Adleman), ECC (Elliptic Curve Cryptography), and DH (Diffie-Hellman) are examples of asymmetric encryption algorithms. RSA is one of the first and most widely used, but ECC offers similar levels of security with smaller key sizes, making it efficient for certain applications.

Symmetric encryption is faster and more efficient for encrypting large data volumes. Asymmetric encryption, being more computationally intensive, is typically used for smaller data amounts, like encrypting the symmetric keys themselves for secure transmission.

Now, the issue with all of these algorithms is they will be broken once there are stable and power enough quantum computers. Again, as described herein, it is difficult to completely migrate to PQC algorithms, which is the problem addressed herein.

Quantum Computing

Quantum computers leverage the principles of quantum mechanics to process information in ways fundamentally different from classical computers. The basic unit of quantum information is the quantum bit or qubit, which represents a significant departure from the binary bit used in classical computing. The computational power of a quantum computer scales exponentially with the number of qubits. Doubling the number of qubits does not just double the computational power; it potentially squares it. This scaling property is why quantum computing holds so much promise for solving certain types of problems that are intractable for classical computers, such as factoring large numbers (important for cryptography).

The quantum vault described herein is meant to offer protection, in its outermost layer, against the current state of quantum computing, expressed in qubits. The number of qubits required to break conventional symmetric and asymmetric encryption algorithms with a quantum computer varies significantly based on the type of encryption and the specific algorithm in question. The two main quantum algorithms of relevance here are Grover's Algorithm, which impacts symmetric encryption, and Shor's Algorithm, which impacts asymmetric encryption.

Asymmetric algorithms like RSA, ECC, and DH are particularly vulnerable to Shor's Algorithm, which can solve the underlying hard mathematical problems (factoring large numbers for RSA, discrete logarithm for ECC and DH) in polynomial time. For RSA, ECC, and similar algorithms, the number of qubits needed to effectively break these forms of encryption is roughly on the order of the key size for the algorithm, but with significant overhead for error correction and the quantum algorithm itself. For instance, to break RSA-2048 encryption, a quantum computer would need not just 2048 qubits, but several thousand qubits when you account for error correction. Practical estimates suggest that breaking RSA-2048 might require a quantum computer with anywhere from 4,000 to over 20,000 physical qubits, the wide range accounting for different assumptions about error rates and error correction techniques.

Symmetric encryption algorithms like AES are affected differently by quantum computing. Grover's Algorithm can theoretically be used to perform a brute-force search on a symmetric encryption key space in square root time, effectively halving the bit strength of the encryption. For AES-128, the effective security level in the presence of a quantum computer would be equivalent to 64 bits of security in classical terms, meaning $2^{64}$ operations would be needed for a brute-force attack. This implies that a quantum computer would need to be capable of running Grover's Algorithm efficiently against the 128-bit key space. For AES-256, the security level would be equivalent to 128 bits, requiring $2^{128}$ operations, which is still considered secure against brute-force attacks even in a quantum world. The number of qubits needed for Grover's Algorithm to effectively break AES would have to be large enough to handle the encryption key space, plus additional qubits for error correction. However, precise numbers depend on the specifics of the quantum computing architecture and the efficiency of the error correction mechanisms employed.

PQC Algorithms

Post-Quantum Cryptography (PQC) refers to cryptographic algorithms that are designed to be secure against an attack by a quantum computer. As traditional public-key cryptographic algorithms like RSA, ECC (Elliptic Curve Cryptography), and DH (Diffie-Hellman) could potentially be broken by quantum computers using algorithms like Shor's, the development of PQC is aimed at safeguarding information security in the forthcoming quantum era. PQC algorithms rely on mathematical problems that are believed to be hard for quantum computers to solve, ensuring their security.

Here are some of the main families of PQC algorithms:

(1) Lattice-based algorithms are based on the hardness of lattice problems, such as the Shortest Vector Problem (SVP) and the Closest Vector Problem (CVP). These problems involve finding the shortest or closest vector in a high-dimensional lattice, which is computationally hard for both classical and quantum computers. Lattice-based cryptography is very versatile and can be used to build a wide range of cryptographic primitives, including encryption, digital signatures, and fully homomorphic encryption (FHE). Examples include NTRU and Kyber, the latter being selected for standardization by the National Institute of Standards and Technology (NIST) PQC project.

(2) Code-based cryptography is founded on the difficulty of decoding randomly generated linear codes, a problem known to be NP-hard. The most famous example is the McEliece cryptosystem, which has remained secure against both classical and quantum attacks for several decades. These algorithms tend to have large key sizes, which can be a drawback for certain applications.

(3) Hash-based cryptography constructs digital signatures from secure hash functions. The security of these schemes relies on the difficulty of finding collisions in hash functions, a task believed to be quantum-resistant. Hash-based signature schemes, such as the Lamport signatures and their more efficient successors (e.g., XMSS and LMS), are simple and have well-understood security assumptions. However, they typically produce larger signatures and keys than traditional algorithms.

(4) Cryptography based on multivariate quadratic equations involves solving systems of quadratic equations over finite fields, a problem that is NP-hard. MQ schemes can be used for encryption and digital signatures. The security of MQ cryptography comes from the difficulty of finding solutions to these equations, which remains hard for quantum computers. Examples include the Rainbow signature scheme.

(5) Isogeny-based cryptography is the newest family of PQC algorithms and is based on the difficulty of finding isogenies between elliptic curves. The most well-known protocol in this category is SIKE (Supersingular Isogeny Key Encapsulation). While it offers smaller key sizes compared to other post-quantum algorithms, isogeny-based cryptography is less understood, and its security properties are still being researched.

NIST has been leading an effort to standardize post-quantum cryptographic algorithms. NIST is in the process of selecting a set of algorithms for standardization, marking a significant step toward the widespread adoption of quantum-resistant cryptographic solutions.

The present disclosure contemplates any PQC algorithm. The advantage of the quantum vault is it can select any PQC algorithm, update to add more advanced PQC algorithms, and the like, while preserving the existing infrastructure.

Secrets

As described herein, the term secrets is used to denote some piece of data or information being protected by the quantum vault. That is, secrets refer to confidential information that is used to protect secure communications, authenticate identities, or authorize access to resources. These pieces of data need to be safeguarded from unauthorized access but must be available to those entities (people, applications, systems) that are authorized to use them, which is the function of the quantum vault described herein.

Secrets can come in various forms, including but not limited to:

(1) Passwords and Passphrases: These are the most common types of secrets, used by individuals to gain access to systems, applications, or services.

(2) Encryption Keys: Keys are used in cryptographic operations to encrypt and decrypt data. This includes symmetric keys (the same key used for both encrypting and decrypting) and asymmetric keys (a public and private key pair, where one is used for encryption and the other for decryption).

(3) Application Programming Interface (API) Keys: These are used to authenticate and authorize applications when accessing APIs (Application Programming Interfaces). API keys act as a secret identifier for the application, ensuring that only authorized applications can access certain services.

(4) Tokens: Tokens, such as OAuth tokens, are used in various authentication and authorization frameworks to grant access to resources without revealing a user's credentials. Tokens can be issued after a user successfully logs in and can be used to access services on behalf of the user.

(5) Certificates: Digital certificates, including SSL/TLS certificates, are used to verify the identity of entities on the internet and to facilitate encrypted communication. The private keys associated with these certificates are also considered secrets.

(6) Secret Questions and Answers: These are personal information pieces used for additional security verification. However, their effectiveness as secrets is debated due to the often easily guessable or researchable nature of the answers.

Quantum Vault

FIG. 1 is a logical diagram of a quantum vault 100. In particular, FIG. 1 illustrates logically how a secret 102 is protected by one or more layers 104 of encryption. The quantum vault 100 includes the data, i.e., the secret 102, and encryption, i.e., the one or more layers 104, and is stored on a computing device (see, e.g., FIG. 3). The present disclosure includes the structure of the quantum vault 100 along with an approach to upgrade the quantum vault 100 via adding layers 104 over time, as necessary. The advantage of the quantum vault 100 is it enables the secret 102 to be securely stored, against the current state of quantum computing, and is implementable solely in software, i.e., no hardware upgrades.

The secret 102 can be any of the secrets described above. In a particular non-limiting use case, the secret 102 can be an encryption key. An advantage of using the quantum vault 100 for encryption keys is it allows the existing infrastructure to remain, i.e., there has been a lot of investment in infrastructure, while providing protection against quantum computing. Of course, those skilled in the art will appreciate the quantum vault 100 can protect any secret 102.

Additionally, each of the one or more layers 104 includes a corresponding key 106 to unlock the corresponding layer 104. These keys 106 are stored separate from the quantum vault 100, using various techniques for key storage, such as in a Trusted Platform Module (TPM), HSM, secure enclave, operating system keychain, cryptographic software library, etc. Also, it is possible to use techniques such as secret chaining, secret sharing, etc. to distribute the keys 106 amongst a groups of entities. A key point is the outermost layer 104 of the quantum vault 100 is the most important, providing protection against the current state of quantum computing. As such, in some embodiments, it is possible to simply maintain the keys 106 for the interior layers inside the quantum vault 100, so once the outermost layer 104 is opened, it is possible to easily open the remaining layers 104. Of course, any approach of managing the keys 106 for opening the layers 104 is contemplated herewith.

The quantum vault 100 can be managed by a central authority, cloud service provider, or some other entity responsible for managing the quantum vault 100, namely defining the layers 104, their underlying encryption, etc. That is, there are two entities associated with the quantum vault 100, namely the entity that defines the layers 104 including pushing out upgrades as deemed necessary to meet quantum computing qubit improvement and the computing systems themselves with one or more quantum vaults 100 deployed thereon.

There will be different organization of the layers 104 based on the deployment time of a given quantum vault 100. Namely, if you are initially deploying the quantum vault 100, it will only have the first layer 104-1, which will be sufficient as this will be an algorithm that is currently resistant to quantum computers. For example, the first layer 104-1 may not need be a PQC algorithm since quantum computers are not capable right now of breaking AES-128 or RSA-2048. That is, the definition of the layers 104 may be different for different quantum vaults 100 based on their deployment time, based on the defined layer 104 upgrades.

Let's describe an example deployment of the quantum vault 100. Assume there will be N layers 104, labeled 104-1, 104-2, 104-N in our example, and the secret 102 can be something arbitrary, say any of the secrets described above. At deployment, the quantum vault 100 is configured with the first layer 104-1 only, protecting the secret 102. Assume this is deployed today, so a first encryption algorithm in the first layer 104-1 can be AES-128 or RSA-2048 or even a PQC algorithm. For example, Crystals-Dilithium has different levels, level 1, 2, 3, and 5. So, the first layer 104-1 could use a low level of Crystals-Dilithium, e.g., level 1.

This quantum vault 100 is deployed and used to protect the secret 102 with the single layer 104-1. Now, assume after some time, there has been breakthroughs and computing power of quantum computers is deemed to be able to break the first encryption algorithm. The entity that defines the layers 104 determines there is a need for a second layer 104-2 for all deployed quantum vaults 100 with the first layer 104-1. The second layer 104-2 will use a second encryption algorithm that is different than and more powerful from the first encryption algorithm. For example, assume the first encryption algorithm is Crystals-Dilithium level 2, the second encryption algorithm may now be Crystals-Dilithium level 3 or 5. Other examples for the second encryption algorithm can include Falcon, Sphincs+, or the like, as well as new algorithms.

Of note, this determination can also mean that any new quantum vaults 100 will be deployed with the second encryption algorithm on the first layer 104. That is, there is no need to deploy new quantum vaults 100 with encryption algorithms deemed to be susceptible to quantum computers. The objective of the quantum vault 100 is to protect the secret 102 today as well as offer an upgrade to protect the secret 102 later without the need to completely change the infrastructure. If the secret 102 is removed from an old quantum vault 100 and put in a new quantum vault 100, the new quantum vault can be secure from day one in the first layer 104-1.

The advantage of the quantum vault 100 is that it provides a framework for secure storage that adapts over time and that does not require new infrastructure.

Processes

FIG. 2 is a flowchart of a process 200 for managing a quantum vault by a service provider. The process 200 contemplates implementation as a method having steps, via a computing system configured to implement the steps, and via a non-transitory computer-readable medium storing instructions for programming one or more processors to execute the steps. The process 200 is described with reference to an entity managing the quantum vault, i.e., a central authority, cloud service provider, or any entity responsible for defining the layers 104.

The process 200 includes, responsive to a determination of a first level of quantum computing processing capability, defining a first encryption algorithm for the quantum vault such that the first encryption algorithm is sufficient to protect against the first level of quantum computing, such that a first layer of the quantum vault is configured with the first encryption algorithm (step 202); and monitoring the quantum computing processing capability (step 204); and, responsive to a determination of a second level of the quantum computing processing capability where the first encryption algorithm is no longer sufficient to protect against, defining a second encryption algorithm for the quantum vault such that the second encryption algorithm is sufficient to protect against the second level of quantum computing processing capability, and such that the second encryption algorithm is configured as an outermost layer over the first encryption algorithm (step 206).

The process 200 can further include continuing the monitoring and adding one or more additional layers with one or more additional encryption algorithms, based on the monitoring of quantum computing processing capability. At any given time, an outermost layer of the quantum vault is sufficient to protect against a current level of quantum computing processing capability.

The process 200 can further include causing a new quantum vault to be created after the determination of the second level with a first layer of the new quantum vault utilizing the second encryption algorithm. The first encryption algorithm can include a classical encryption algorithm and the second encryption algorithm includes a Post Quantum Cryptography (PQC) algorithm. The first encryption algorithm can include a first Post Quantum Cryptography (PQC) algorithm and the second encryption algorithm includes a second PQC algorithm. The quantum computing processing capability can be based on qubit processing capability. The secret can be an encryption key associated with one of a symmetric algorithm and an asymmetric algorithm.

FIG. 3 is a flowchart of a process 250 for securing a secret with a quantum vault at a computing system, such as user equipment. The process 250 contemplates implementation as a method having steps, via a computing system configured to implement the steps, and via a non-transitory computer-readable medium storing instructions for programming one or more processors to execute the steps. The process 250 is described with reference to an end device, i.e., user equipment, laptop, desktop, mobile phone, tablet, Internet of Things (IoT) device, or simply any computing device.

The process 250 includes obtaining a secret for storage on the computing device (step 252); creating a quantum vault where the secret is stored therein, the quantum vault comprising a first encryption algorithm protecting the secret, the first encryption algorithm is sufficient to protect against a first level of quantum computing, and the first encryption algorithm being a first layer of the quantum vault (step 254); receiving an update for the quantum vault responsive to a determination of a second level of the quantum computing processing capability where the first encryption algorithm is no longer sufficient to protect against the first level of quantum computing (step 256); and creating a second layer of the quantum vault with a second encryption algorithm for the quantum vault such that the second encryption algorithm is sufficient to protect against the second level of quantum computing processing capability, and such that the second encryption algorithm is configured as an outermost layer over the first encryption algorithm (step 258). Again, the quantum vault includes the secret and associated layers of encryption, all being stored in memory.

The process 250 can further include adding one or more additional layers with one or more additional encryption algorithms, based on one or more additional levels of quantum computing processing capability. At any given time, an outermost layer of the quantum vault is sufficient to protect against a current level of quantum computing processing capability. The quantum computing processing capability can be based on qubit processing capability.

Computing System

FIG. 4 is a block diagram of a computing system 300, which may be used to implement a quantum vault. The computing system 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 4 depicts the computing system 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a Central Processing Unit (CPU), an auxiliary processor among several processors associated with the computing system 300, a semiconductor-based microprocessor (in the form of a microchip or chipset), or generally any device for executing software instructions. When the computing system 300 is in operation, the processor 302 is configured to execute software stored within the memory 310, to communicate data to and from the memory 310, and to generally control operations of the computing system 300 pursuant to the software instructions. The I/O interfaces 304 may be used to receive user input from and/or for providing system output to one or more devices or components.

The network interface 306 may be used to enable the computing system 300 to communicate on a network, such as the Internet. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store

308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 308 may incorporate electronic, magnetic, optical, and/or other types of storage media. In one example, the data store 208 may be located internal to the computing system 300, such as, for example, an internal hard drive connected to the local interface 312 in the computing system 300. Additionally, in another embodiment, the data store 308 may be located external to the computing system 300 such as, for example, an external hard drive connected to the I/O interfaces 204 (e.g., SCSI or USB connection). In a further embodiment, the data store 208 may be connected to the computing system 300 through a network, such as, for example, a network-attached file server.

The memory 310 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable Operating System (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Of note, the general architecture of the computing system 300 can define any device described herein. However, the computing system 300 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. NIST provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method for managing a quantum vault for storing a secret, the method comprising steps of:

responsive to a determination of a first level of quantum computing processing capability, defining a first encryption algorithm for the quantum vault such that the first encryption algorithm is sufficient to protect against the first level of quantum computing processing capability, such that a first layer of the quantum vault is configured with the first encryption algorithm;

monitoring the quantum computing processing capability; and responsive to a determination of a second level of the quantum computing processing capability where the first encryption algorithm is no longer sufficient to protect against, defining a second encryption algorithm for the quantum vault such that the second encryption algorithm is sufficient to protect against the second level of quantum computing processing capability, and such that the second encryption algorithm is configured as an outermost layer over the first encryption algorithm wherein one of the first encryption algorithm includes a classical encryption algorithm and the second encryption algorithm includes a Post Quantum Cryptography (PQC) algorithm, or the first encryption algorithm includes a first Post Quantum Cryptography (PQC) algorithm and the second encryption algorithm includes a second PQC algorithm.

2. The method of claim 1, wherein the steps further include:

continuing the monitoring and adding one or more additional layers with one or more additional encryption algorithms, based on the monitoring of quantum computing processing capability.

3. The method of claim 2, wherein, at any given time, an outermost layer of the quantum vault is sufficient to protect against a current level of quantum computing processing capability.

4. The method of claim 1, wherein the steps further include:

causing a new quantum vault to be created after the determination of the second level with a first layer of the new quantum vault utilizing the second encryption algorithm.

5. The method of claim 1, wherein the quantum computing processing capability is based on qubit processing capability.

6. The method of claim 1, wherein the secret is an encryption key associated with one of a symmetric algorithm and an asymmetric algorithm.

7. A cloud service comprising one or more processors and memory storing instructions that, when executed, cause the one or more processors to perform steps of:

responsive to a determination of a first level of quantum computing processing capability, defining a first encryption algorithm for a quantum vault, configured to store and protect a secret, such that the first encryption algorithm is sufficient to protect against the first level of quantum computing processing capability, such that a first layer of the quantum vault is configured with the first encryption algorithm;

monitoring the quantum computing processing capability; and responsive to a determination of a second level of the quantum computing processing capability where the first encryption algorithm is no longer sufficient to protect against, defining a second encryption algorithm for the quantum vault such that the second encryption algorithm is sufficient to protect against the second level of quantum computing processing capability, and such that the second encryption algorithm is configured as an outermost layer over the first encryption algorithm wherein one of the first encryption algorithm includes a classical encryption algorithm and the second encryption algorithm includes a Post Quantum Cryptography (PQC) algorithm, or the first encryption algorithm includes a first Post Quantum Cryptography (PQC) algorithm and the second encryption algorithm includes a second PQC algorithm.

8. The cloud service of claim 7, wherein the steps further include:

continuing the monitoring and adding one or more additional layers with one or more additional encryption algorithms, based on the monitoring of quantum computing processing capability.

9. The cloud service of claim 8, wherein, at any given time, an outermost layer of the quantum vault is sufficient to protect against a current level of quantum computing processing capability.

10. The cloud service of claim 7, wherein the steps further include:

causing a new quantum vault to be created after the determination of the second level with a first layer of the new quantum vault utilizing the second encryption algorithm.

11. The cloud service of claim 7, wherein the quantum computing processing capability is based on qubit processing capability.

12. The cloud service of claim 7, wherein the secret is an encryption key associated with one of a symmetric algorithm and an asymmetric algorithm.

13. A method for managing a quantum vault for storing a secret, the method comprising steps of:

responsive to a determination of a first level of quantum computing processing capability, defining a first encryption algorithm for the quantum vault such that the first encryption algorithm is sufficient to protect against the first level of quantum computing processing capability, such that a first layer of the quantum vault is configured with the first encryption algorithm;

monitoring the quantum computing processing capability;

responsive to a determination of a second level of the quantum computing processing capability where the first encryption algorithm is no longer sufficient to protect against, defining a second encryption algorithm for the quantum vault such that the second encryption algorithm is sufficient to protect against the second level of quantum computing processing capability, and such that the second encryption algorithm is configured as an outermost layer over the first encryption algorithm; and causing a new quantum vault to be created after the determination of the second level with a first layer of the new quantum vault utilizing the second encryption algorithm.

14. The method of claim 13, wherein the steps further include:

continuing the monitoring and adding one or more additional layers with one or more additional encryption algorithms, based on the monitoring of quantum computing processing capability.

15. The method of claim 14, wherein, at any given time, an outermost layer of the quantum vault is sufficient to protect against a current level of quantum computing processing capability.

16. The method of claim 13, wherein the first encryption algorithm includes a classical encryption algorithm and the second encryption algorithm includes a Post Quantum Cryptography (PQC) algorithm.

17. The method of claim 13, wherein the first encryption algorithm includes a first Post Quantum Cryptography (PQC) algorithm and the second encryption algorithm includes a second PQC algorithm.

18. The method of claim 13, wherein the quantum computing processing capability is based on qubit processing capability.

19. The method of claim 13, wherein the secret is an encryption key associated with one of a symmetric algorithm and an asymmetric algorithm.

*    *    *    *    *